(12) United States Patent
Murakami

(10) Patent No.: US 7,189,930 B2
(45) Date of Patent: Mar. 13, 2007

(54) GROMMET

(75) Inventor: Tomoyasu Murakami, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/353,064

(22) Filed: Feb. 14, 2006

(65) Prior Publication Data

US 2006/0201710 A1 Sep. 14, 2006

(30) Foreign Application Priority Data

Feb. 14, 2005 (JP) .................. P2005-036259

(51) Int. Cl.
*H02G 3/18* (2006.01)

(52) U.S. Cl. .............. 174/650; 174/659; 174/668; 16/2.1; 248/56

(58) Field of Classification Search ........ 174/480, 174/481, 650, 660, 661–669, 152 R, 153 G, 174/152 G, 135; 16/2.1, 2.2; 248/56; 439/567, 439/462
See application file for complete search history.

(56) References Cited

U.S. PATENT DOCUMENTS 6,680,437 B2 * 1/2004 Sato .................. 174/653

FOREIGN PATENT DOCUMENTS

| JP | 59-006468 A | 1/1984 |
|---|---|---|
| JP | 61-109211 A | 5/1986 |
| JP | 04-249817 A | 9/1992 |
| JP | 05-198228 A | 8/1993 |
| JP | 06-203679 A | 7/1994 |
| JP | 06-349366 A | 12/1994 |
| JP | 07-042878 A | 2/1995 |
| JP | 08-096642 A | 4/1996 |
| JP | 08-167339 A | 6/1996 |
| JP | 08-316658 A | 11/1996 |
| JP | 09-093760 A | 4/1997 |
| JP | 2000-295740 A | 10/2000 |
| JP | 11-007885 A | 2/2001 |
| JP | 2001-041359 A | 2/2001 |
| JP | 2001-231134 A | 8/2001 |
| JP | 2001-258129 A | 9/2001 |
| JP | 2001-258131 A | 9/2001 |
| JP | 2001-275232 A | 10/2001 |
| JP | 2002-078162 A | 3/2002 |
| JP | 2004-187354 A | 7/2004 |
| JP | 2004-265788 A | 9/2004 |

\* cited by examiner

*Primary Examiner*—Dhiru R. Patel
(74) *Attorney, Agent, or Firm*—Sughrue Mion, PLLC

(57) ABSTRACT

A grommet includes a cylindrical portion that operable to fit on an outer circumference of an electric wire which passes through a trough hole in a panel, a panel fitting portion on which an inner circumferential edge of the through hole in the panel is fitted, and a connecting portion that connects the cylindrical portion and the panel fitting portion. The panel fitting portion includes a seal projection that is brought into press contact with the panel, and a seal protection wall is provided on the panel fitting portion for reducing the influence to the panel fitting portion caused by a flow of injected water from external.

4 Claims, 6 Drawing Sheets

A < B

GROMMET

BACKGROUND OF THE INVENTION

The present invention relates to a grommet which is mounted in an electric wire passing portion of a panel such as a body of a vehicle in order to preserve waterproofness of an electric wire at the electric wire passing portion while protecting an electric wire which passes through the grommet.

This type of grommet is formed of a flexible material such as rubber and is fitted in a through hole (a panel hole) formed in a panel of a vehicle or the like to hold therein a wiring harness, having functions to protect the wiring harness and to preserve waterproofness at the through hole.

FIG. 5 is a sectional view which shows an example of a grommet according to the related art. For example, JP-A-4-249817 discloses a grommet similar to the above type of grommet.

The entirety of this grommet 1 is formed into an integral unit of a flexible material such as rubber. The grommet 1 includes a panel fitting portion 10 having an outer circumference on which an inner circumferential edge of a through hole Pa of a panel P is fitted, an electric wire fitting portion 30 which fits on an outer circumference of an electric wire (a wiring harness) W which passes through the through hole Pa in the panel P, and a hollow conical connecting portion 20 which connects between the panel fitting portion 10 and the electric wire fitting portion 30. The panel fitting portion 10 has a large-diameter and thick annular form. The electric wire fitting portion 30 has a small-diameter and thin cylindrical form.

The panel fitting portion 10 includes an annular flange portion 11 which is provided on an opposite side thereof to the connecting portion 20 which is larger in diameter than the through hole Pa in the panel P and is thick, an annular raised portion 13 climbing up and down at a moderate angle in section which is provided on an outer circumference of a side thereof which lies to the connecting portion 20 in such a manner as to protrude therefrom with an annular recessed portion 14 interposed between the annular flange portion 11 and itself, and a seal projection 12 provided on a side of the annular flange portion 11 which lies to the connecting portion 20 in such a manner as to protrude therefrom towards the annular raised portion 13, so as to be brought into press contact with a surface of the panel P at a distal end thereof to push the panel P towards the connecting portion 20, whereby a circumferential edge portion of the through hole Pa in the panel P which passes over the annular raised portion 13 from an opposite side to be fitted in the annular recessed portion 14 is brought into press contact with a shoulder portion of the annular raised portion 13, so that a sealing performance is secured between the panel P and the grommet by two press contact portions (sealed portions) S1, S2 which are attained in this configuration. In the illustrated example, the seal projection 12 is provided on the annular flange portion 11 further radially inwards than an outermost circumference thereof via a difference in level 15 therebetween.

Here, the annular raised portion 13 is formed as a raised portion which climbs up and down at a moderate angle, whereby the annular raised portion 13 is allowed to easily pass into the through hole Pa in the panel P when the grommet 1 is attempted to be fitted into the through hole P from the connecting portion 20 side thereof. Namely, the facilitation of fitting work of the grommet 1 is realized by forming the annular raised portion 13 into the shape which does not project largely to the outer circumference side with a difference in level.

In addition, on the surface of the panel P, since the distal end of the annular seal projection 12 is elastically pressed against the surface of the panel P, it becomes possible to easily adapt to some change in thickness of the panel P and a slight deformation of the panel P even if such change and deformation actually happen, as long as the change and deformation of the panel P fall within a permissible range of elastic deformation of the seal projection 12.

Incidentally, when applying the grommet 1 to a vehicle, a case is considered to occur when washing the vehicle, for example, in which a flow of water injected under high pressure from a high-pressure washing machine directly strikes the grommet 1. A person who is washing the vehicle has no idea on an angle at which the flow of high pressure injected water hits the grommet 1 during washing, and therefore, it is extremely important that the sealing performance of the grommet 1 is not damaged even in the event that the flow of high pressure injected water directly hits the grommet 1 at a special angle.

In the case of the grommet 1 shown in FIG. 5, however, it has been found that the maintenance of sealing property of the grommet 1 cannot be perfect depending on the angle at which the flow of high pressure injected water hits the grommet 1 due to the following reasons which can be raised as structural features of the grommet 1. First, the annular seal projection 12 is configured so as to be relatively flexible in order to cope with a change in thickness of the panel P. Second, the inner circumferential edge of the through hole Pa in the panel P is pressed against the shoulder portion of the annular raised portion 13 climbing up and down at the moderate angle in section by virtue of the pressure of the seal projection 12.

Namely, as shown in FIG. 6, in the event that a flow of high pressure injected water 101 from a high pressure washing machine nozzle 100 directly hits the seal projection 12 from the outer circumferential side to thereby deflect the seal projection 12 through an angle θ or larger, the contact pressure at the sealed portions (the press contact portions S1, S2) is lowered, leading to a risk that a gap may be produced at the relevant portions, so as to allow the injected water to intrude into the body as indicated by an arrow F.

In addition, as shown in FIG. 7, the flow of high pressure injected water 101 which has hit the panel P and rebounded hits the portion of the annular flange portion 11 which the difference in level 15 is produced, whereby the annular flange portion 11 is caused to deflect through an angle θ or larger, and the contact pressure of the seal projection 12 against the panel P is lowered. As a result, there may be caused a risk that the injected water is allowed to intrude into the body from the sealed portions (the press contact portions S1, S2) as indicated by an arrow F.

SUMMARY OF THE INVENTION

It is therefore an object of the present invention to provide a grommet which has no risk that waterproofness is damaged even in the event that the grommet is hit by a flow of high pressure injected water from the high pressure washing machine.

In order to achieve the above object, according to the present invention, there is provided a grommet, comprising:

a cylindrical portion that operable to fit on an outer circumference of an electric wire which passes through a trough hole in a panel;

a panel fitting portion on which an inner circumferential edge of the through hole in the panel is fitted; and a connecting portion that connects the cylindrical portion and the panel fitting portion, wherein the panel fitting portion includes:

a seal projection that is brought into press contact with the panel; and a seal protection wall is provided on the panel fitting portion for reducing the influence to the panel fitting portion caused by a flow of injected water from external.

According to the above configuration, since the seal protection wall is provided on the panel fitting portion for protecting the seal projection, even in the event that the flow of high pressure injected water from the high pressure washing machine hits the grommet, the impact of the flow of injected water exerted on the grommet can be reduced by the seat protection wall. Consequently, the direct effect of the flow of highly pressurized water on the seal portion can be reduced, and as a result, the waterproofness of the grommet can be enhanced.

Preferably, wherein the panel fitting portion includes an annular flange portion that is larger in diameter than the through hole in the panel, an annular raised portion, and an annular recessed portion on which the inner circumferential edge of the through hole in the panel is fitted, and being disposed between the annular flange portion and the annular raised portion. The seal projection is provided on the annular flange portion and presses against the panel so that the inner circumferential edge of the through hole in the panel is brought into press contact with the annular raised portion for obtaining two press contact portions. The annular seal protection wall is provided on the annular flange portion and is disposed radially outwards than the seal projection for protecting a press contact portion where the seal projection is in press contact with the panel against the flow of the injected water.

According to the above configuration, since the annular seal protection wall is provided further radially outwards than the seal projection in such a manner as to protect the press contact portion against the surface of the panel by the seal projection, so that the seal projection is surrounded by the seal protection wall around the perimeter thereof, even in the event that the flow of high pressure injected water from the high pressure washing machine attempts to hit the seal projection and the sealed portions, firstly, the flow of high pressure injected water can be received by the seal projection wall, whereby not only can the direction of the flow of high pressure injected water be spread but also the impact exerted by the flow of high pressure injected water can be absorbed. Consequently, the direct effect of the flow of highly pressurized water on the seal portion can be reduced largely, and as a result thereof, the waterproofness of the grommet can be enhanced. In addition, since the sealing property is secured by the press contact of the distal end of the annular seal projection against the panel surface, a flexibility relative to a change in thickness of the panel can be secured.

Preferably, the annular flange portion includes an annular groove having a width greater than a protruding length of the seal protection wall. The annular groove is arranged between the seal protection wall and the seal projection.

According to the above configuration, since the annular groove having the greater width than the protruding length of the seal protection wall is formed between the seal protection wall and the seal projection, a flexible deflection of the seal protection wall towards the annular groove side can be ensured. Namely, by securing the freedom in deflection of the seal protection wall, effects of absorbing the impact resulting when the flow of high pressure injected water hits the seal protection wall 18 and spreading the flow of high pressure injected water can effectively be exhibited.

Preferably, a protruding length of the seal protection wall is set so that a gap is secured between a protruding distal end of the seal protection wall and the panel.

According to the above configuration, since the gap is secured between the protruding distal end of the seal protection wall and a surface of the panel, water is prevented from being held within the annular groove, thereby making it possible to prevent the intrusion of water to the sealed portions.

Preferably, the annular raised portion has a first inclined face and a second inclined face to form a protruding shape in a cross sectional view. The inner circumferential edge of the through hole in the panel is brought into press contact with either the first inclined face or the second inclined face.

According to the above configuration, since the annular raised portion is formed as the raised portion which climbs up and down at a moderate angle in section and the inner circumferential edge of the through hole in the panel is brought into abutment with a shoulder portion of the annular raised portion so formed so as to secure the sealing property of the grommet, the facilitation in mounting the grommet on the panel can be secured.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Hereinafter, an embodiment of the invention will be described by reference to the drawings.

Figure 1:
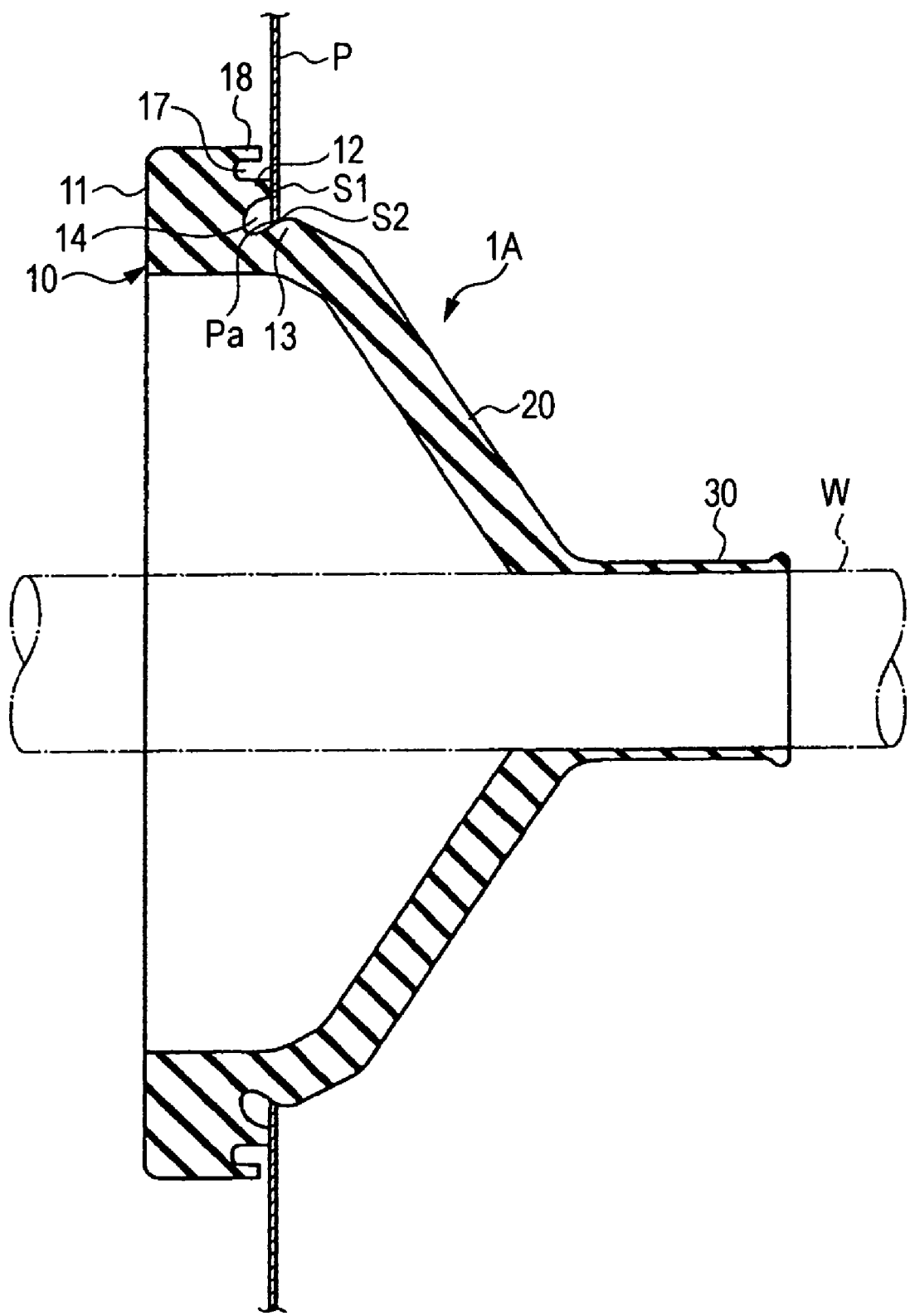
FIG. 1 is a sectional view of a grommet according to an embodiment of the invention.
Figure 2:
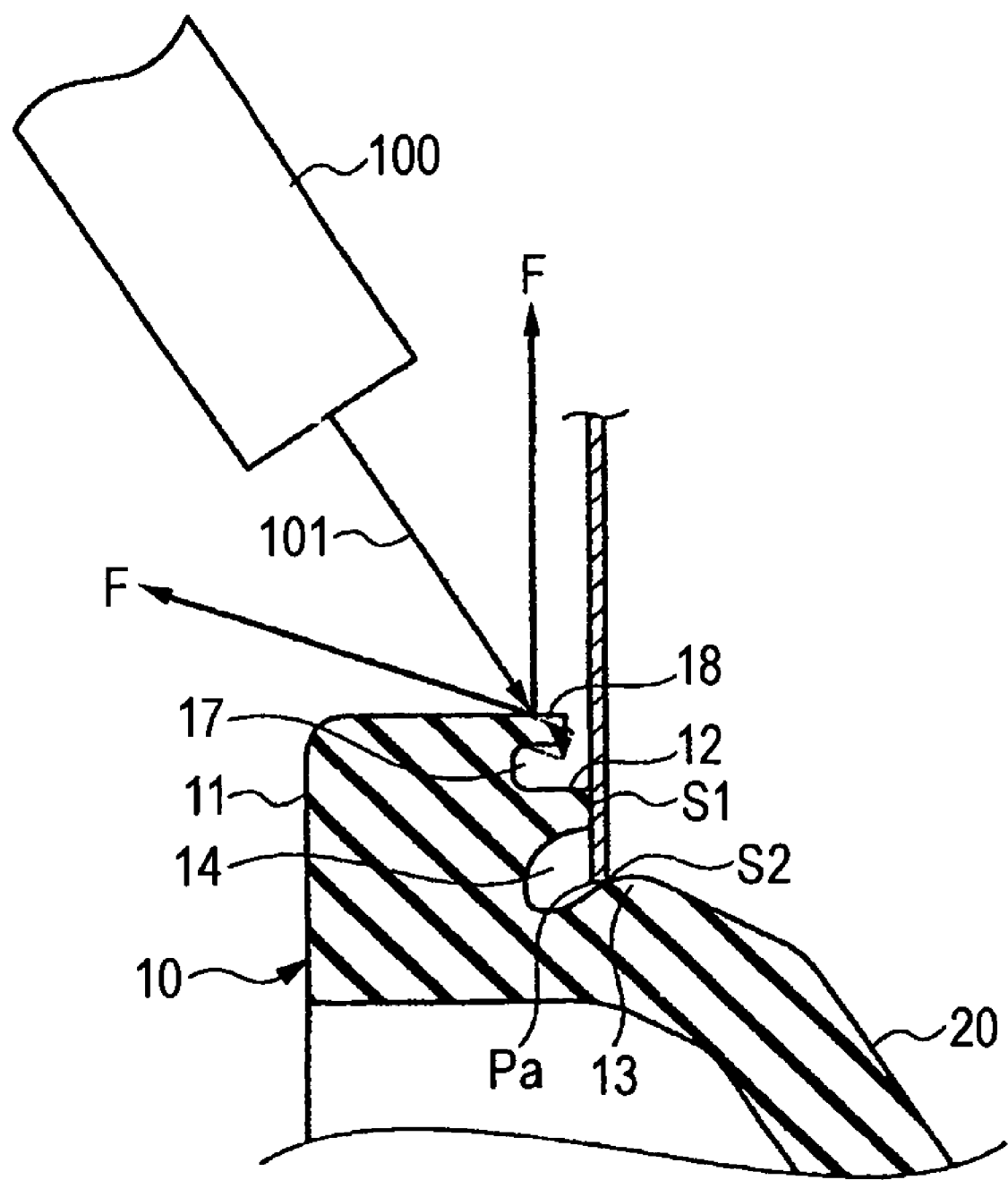
FIG. 2 is an enlarged view of a main part of the grommet of the embodiment.
Figure 3:
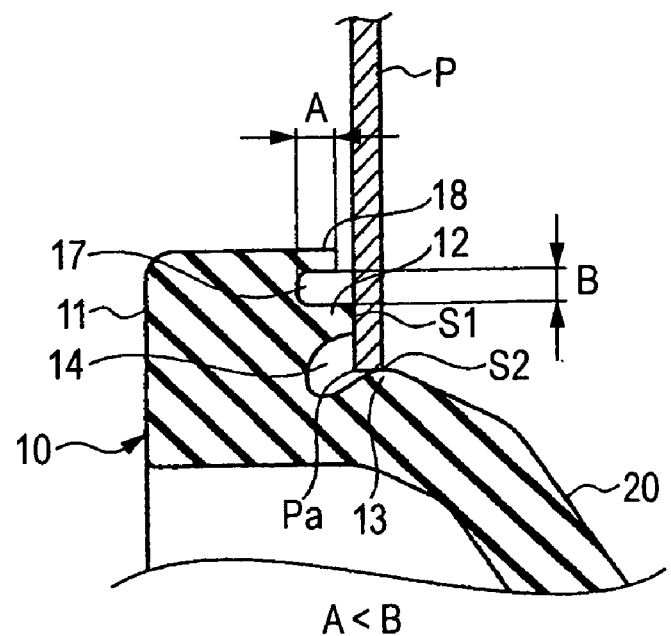
FIG. 3 is an enlarged view of the main part of the grommet of the invention which shows a characteristic point thereof.
Figure 4:
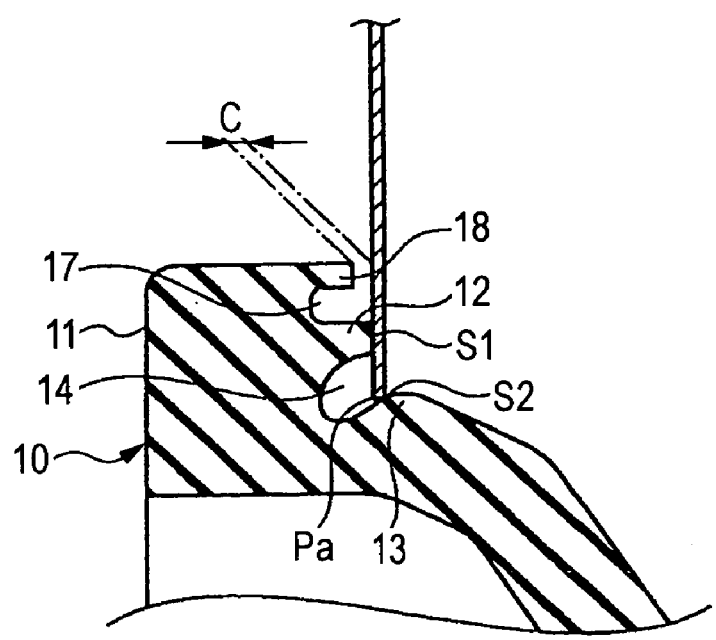
FIG. 4 is an enlarged view of the main part of the grommet of the invention which shows another characteristic point thereof.
Figure 5:
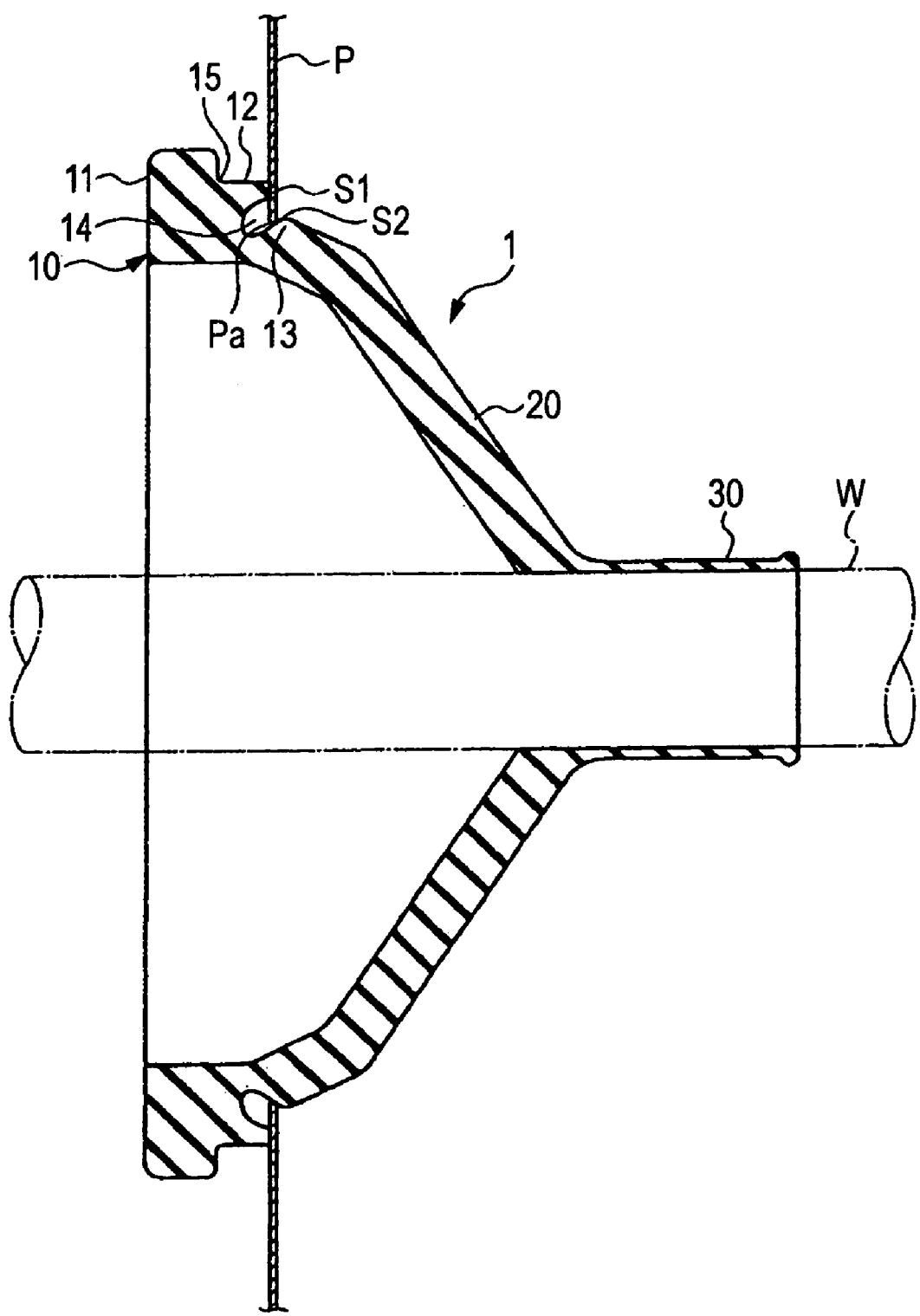
FIG. 5 is a sectional view of a related grommet.
Figure 6:
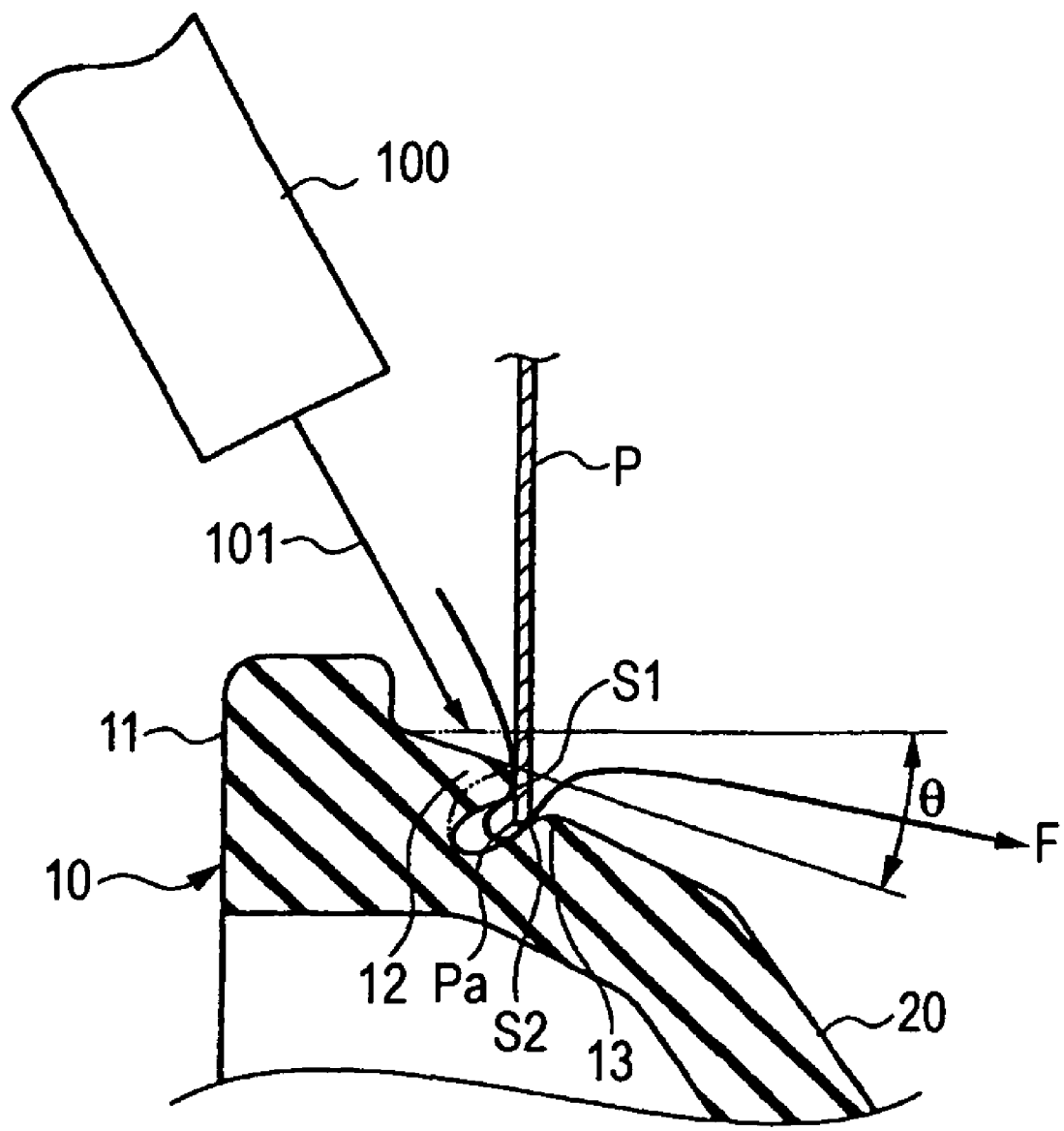
FIG. 6 is an enlarged view of a main part of the related grommet which shows a weak point thereof exhibited in preserving the sealing property thereof.
Figure 7:
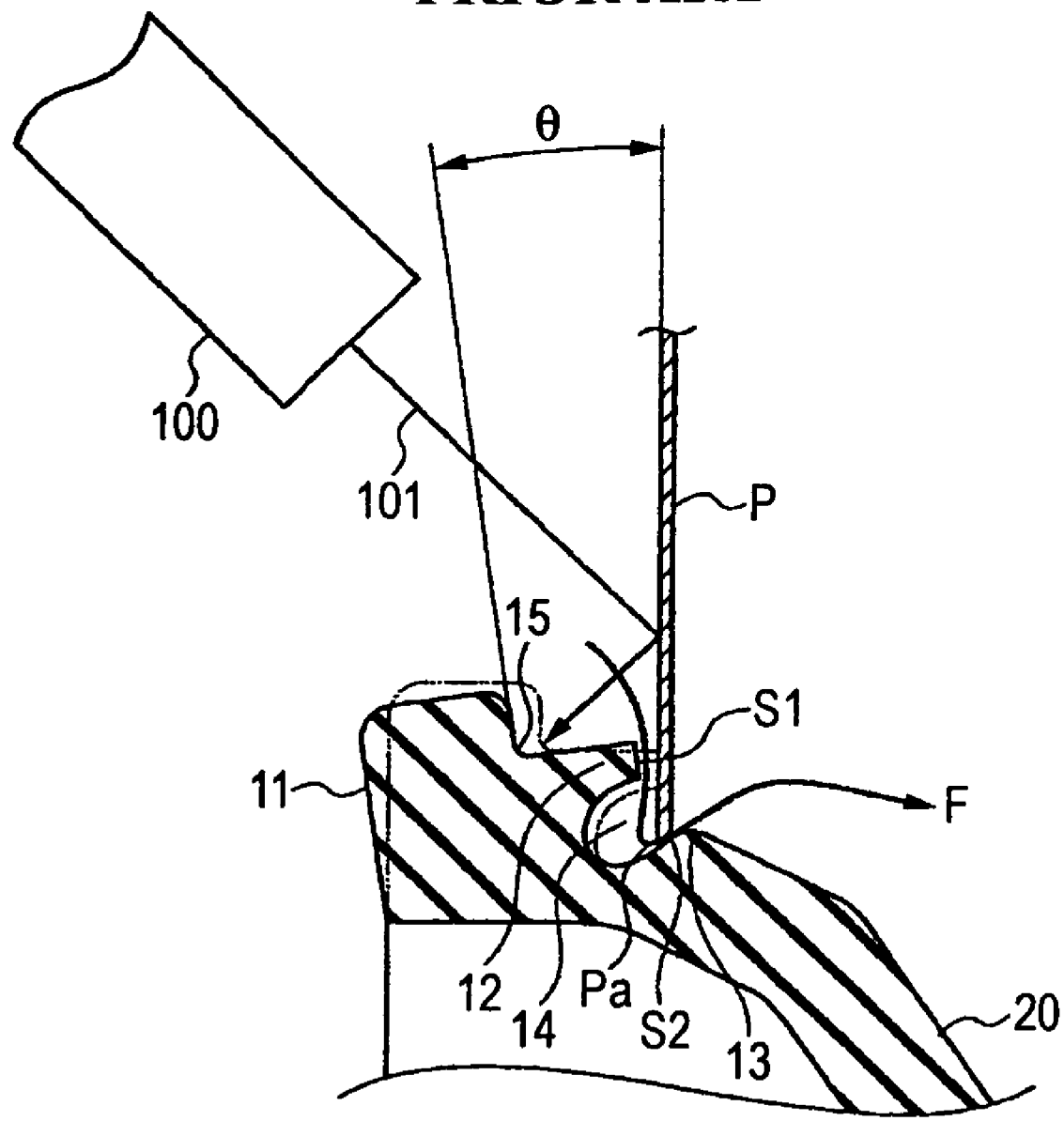
FIG. 7 is an enlarged view of the main part of the related grommet which shows another weak point thereof exhibited in preserving the sealing property thereof.

FIG. 1 is a sectional view of a grommet of an embodiment of the invention, and FIGS. 2 to 4 are enlarged views of the grommet which shows a main part thereof.

This grommet 1A is formed into an integral unit that is made of a flexible material such as rubber and resin. The grommet 1A includes a panel fitting portion 10 having an outer circumference on which an inner circumferential edge of a through hole Pa in a panel P is fitted, an electric wire fitting portion 30 which fits on an outer circumference of an electric wire (a wiring harness) W which passes through the through hole Pa of the panel P, and a hollow conical connecting portion 20 which connects between the panel fitting portion 10 and the electric wire fitting portion 30. The panel fitting portion 10 has a large-diameter and thick annular form. The electric wire fitting portion 30 has a small-diameter and thin cylindrical form. These panel fitting portion 10, electric wire fitting portion 30 and connecting portion 20 are provided concentrically relative to a central axis of the grommet 1A.

The panel fitting portion 10 has a thin annular flange portion 11 which is provided on an opposite side to the connecting portion 20. The annular flange portion 11 is formed to be larger in diameter than the through hole Pa in the panel P, and an annular raised portion 13, which climbs up and down at a moderate angle in section, is provided on an outer circumferential portion of a position on the panel fitting portion 10 which lies closer to the connecting portion 20 than the annular flange portion 11 in such a manner as to protrude therefrom with an annular recessed portion 14 held between the annular flange portion 11 and itself.

In addition, an annular seal projection 12 is provided on a side of the annular flange portion 11 which lies to the connecting portion 20 at a position which is situated slightly further radially inwards than a radially outermost surface of the annular flange portion 11 in such a manner as to protrude in parallel with the central axis of the grommet 1A. This annular seal projection 12 is brought into press contact with a surface of the panel P at a distal end thereof along the full circumference thereof to thereby relatively press the panel P towards the connecting portion 20 side, whereby the annular seal projection 12 functions to bring a circumferential edge portion of the through hole Pa in the panel P which passes over the annular raised portion 13 from an opposite side so as to fit in the annular recessed portion 14 into press contact with a shoulder portion of the annular raised portion 13 which climbs up and down at a moderate angle in section. Then, a sealing performance of the grommet 1A that is to be secured between the panel P and the grommet 1A is designed to be secured by two press connect portions S1, S2 which are attained when the grommet 1A or more specifically the annular seal projection 12 fits in the through hole Pa in the panel P as has been described above.

In addition, an annular seal protection wall 18 is provided on the side of the annular flange portion 11 which lies to the connecting portion 20 side at a position which is situated on the radially outermost surface of the annular flange portion 11 or further radially outwards than the seal projection 12 in such a manner as to protrude in parallel with the central axis of the grommet 1A so as to protect the press contact portion attained by the seal projection 12 through the press contact thereof with the surface of the panel P against an external strong flow of injected water. As shown in an enlarged fashion in FIG. 3, an annular groove 17 having a larger width B than a protruding length A of the annular seal protection wall 18 is provided between the annular seal protection wall 18 and the seal projection 12. In addition, the protruding length A of the annular seal protection wall 18 is set such that an appropriate gap C is, as shown in FIG. 4, secured between a protruding distal end of the annular seal protection wall 18 and the surface of the panel P.

Next, the function of the grommet 1A will be described below.

Firstly, when mounting the grommet 1A on the panel P, the grommet 1A is fitted in the through hole Pa in the panel P from the connecting portion 20 side thereof in such a state that an electric wire (not shown) has been passed through the electric wire fitting portion 30 in advance. Namely, the connecting portion 20 is inserted into the through hole Pa, and then, an apex portion of the annular raised portion 13 is easily passed through the through hole Pa into the body while forcing the annular raised portion 13 to deflect radially inwards. As this occurs, since the annular raised portion 13 is formed as the raised portion which climbs up and down at the moderate angle in section, the annular raised portion 13 can easily be passed through the through hole Pa into the body, whereby fitting work of the grommet 1A can be completed in a simple fashion.

When the apex portion of the annular raised portion 13 has passed through the through hole Pa with an inner circumferential portion of the through hole Pa reaching the annular recessed portion 14, the distal end of the annular seal projection 12 comes to abut the surface of the panel P. Then, the inner circumferential portion of the through hole Pa in the panel P which has fitted in the annular recessed portion 14 comes into press contact with the shoulder portion of the annular raised portion 13 which climbs up and down at the moderate angle in section in response to the elastic pressing action of the seal projection 12, whereby the two press contact portions S1, S2 attained by virtue of the fitting of the annular raised portion 13 into the through hole Pa reside as the sealed portions, thereby a seal being preserved between the panel P and the grommet 1A.

In this event, by adopting the configuration in which the annular seal projection 12 is elastically pressed against the surface of the panel P, even if some change in thickness of the panel P occurs or the panel P itself deforms slightly, the grommet 1A can easily be fitted in the through hole Pa in the panel P, provided the change and the deformation fall within a permissible range of elastic deformation of the seal projection 12.

In the mounted state that has been described above, as shown in FIG. 2, when the flow of high pressure injected water 101 from the high pressure washing machine nozzle 100 is directed towards the sealed portions S1, S2, since the grommet 1A has the annular seal protection wall 18 which is positioned further radially outwards than the seal projection 12 in such a manner as to surround the perimeter of the seal projection 12, the collision of the flow of high pressure injected water 101 can be received by the seal protection wall 18, whereby not only can the direction of the flow of high pressure injected water be spread but also impact generated by virtue of the collision of the flow of high pressure injected water can be absorbed. Consequently, the direct effect of the flow of highly pressurized water on the sealed portions S1, S2 can be reduced largely, thereby making it possible to enhance the waterproofness of the grommet 1A.

In particular, since the annular groove 17 having the larger width B than the protruding length A of the seal protection wall 18 is provided on an inner circumferential side of the seal protection wall 18, the seal protection wall 18 is allowed to freely deflect towards the annular groove 17 side. Due to this, the effects of absorbing the impact resulting when the flow of high pressure injected water 101 hits the seal protection wall 18 and spreading the flow of high pressure injected water can effectively be exhibited by virtue of the deflection of the seal protection wall 18.

In addition, since the gap C is designed to be produced between the protruding distal end of the seal protection wall 18 and the surface of the panel P, the holding of water within the annular groove 17 can be prevented, whereby the intrusion of water into the sealed portions S1, S2 can be prevented as much as possible.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-36259 filed on Feb. 14, 2005, the contents of which are incorporated herein for reference.

What is claimed is:

1. A grommet, comprising:
   a cylindrical portion that operable to fit on an outer circumference of an electric wire which passes through a trough hole in a panel;
   a panel fitting portion on which an inner circumferential edge of the through hole in the panel is fitted; and
   a connecting portion that connects the cylindrical portion and the panel fitting portion,
   wherein the panel fitting portion includes:
      a seal projection that is brought into press contact with the panel; and
      a seal protection wall is provided on the panel fitting portion for reducing the influence to the panel fitting portion caused by a flow of injected water from external, wherein a protruding length of the seal protection wall is set so that a gap is secured between a protruding distal end of the seal protection wall and the panel.

2. The grommet as set forth in claim 1, wherein the panel fitting portion includes:
   an annular flange portion that is larger in diameter than the through hole in the panel;
   an annular raised portion; and
   an annular recessed portion on which the inner circumferential edge of the through hole in the panel is fitted, and being disposed between the annular flange portion and the annular raised portion;
   wherein the seal projection is provided on the annular flange portion and presses against the panel so that the inner circumferential edge of the through hole in the panel is brought into press contact with the annular raised portion for obtaining two press contact portions; and
   wherein the annular seal protection wall is provided on the annular flange portion and is disposed radially outwards than the seal projection for protecting a press contact portion where the seal projection is in press contact with the panel against the flow of the injected water.

3. The grommet as set forth in claim 2, wherein the annular flange portion includes an annular groove having a width greater than a protruding length of the seal protection wall; and
   wherein the annular groove is arranged between the seal protection wall and the seal projection.

4. The grommet as set forth in claim 2, wherein the annular raised portion has a first inclined face and a second inclined face to form a protruding shape in a cross sectional view; and
   wherein the inner circumferential edge of the through hole in the panel is brought into press contact with either the first inclined face or the second inclined face.

* * * * *